Jan. 8, 1946.  W. E. BERGER  2,392,571
TOOL ATTACHMENT
Filed Aug. 8, 1942  2 Sheets-Sheet 1
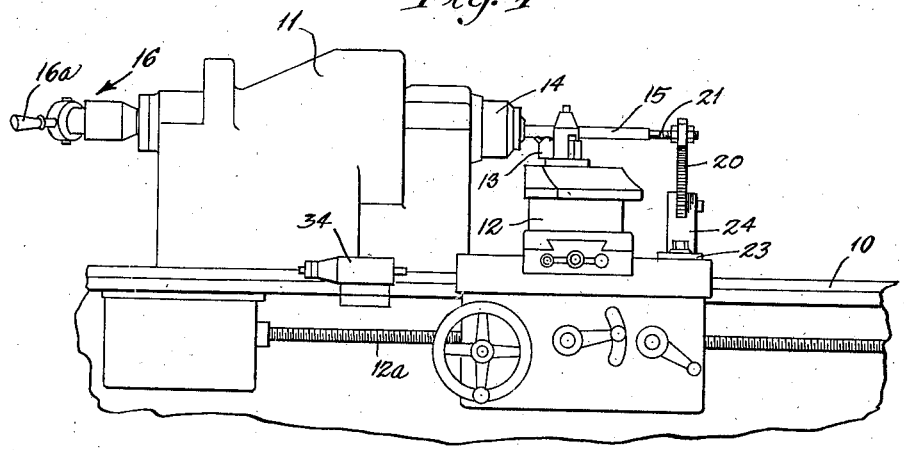
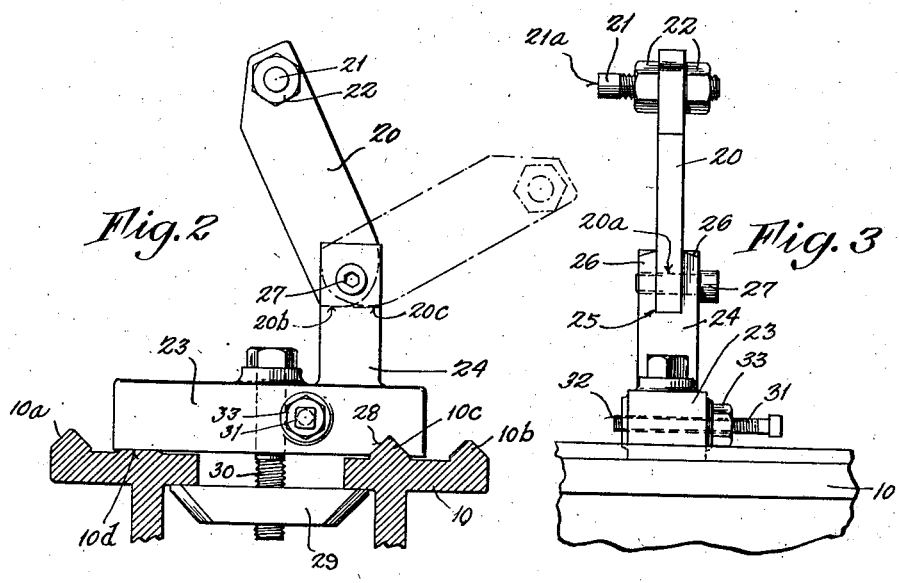
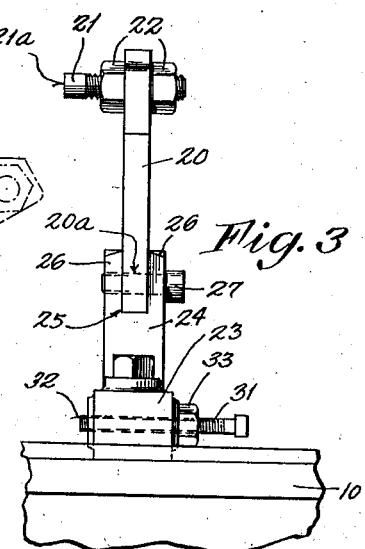
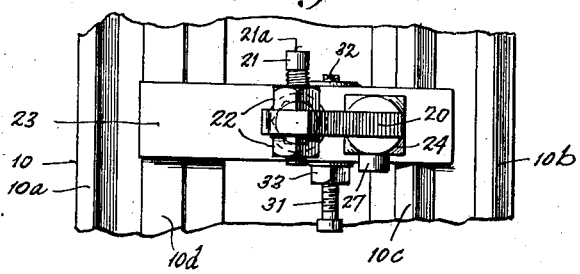
INVENTOR
*Walter E. Berger*
BY
*Johnson and Kline*
ATTORNEYS Jan. 8, 1946. W. E. BERGER 2,392,571
TOOL ATTACHMENT
Filed Aug. 8, 1942 2 Sheets-Sheet 2
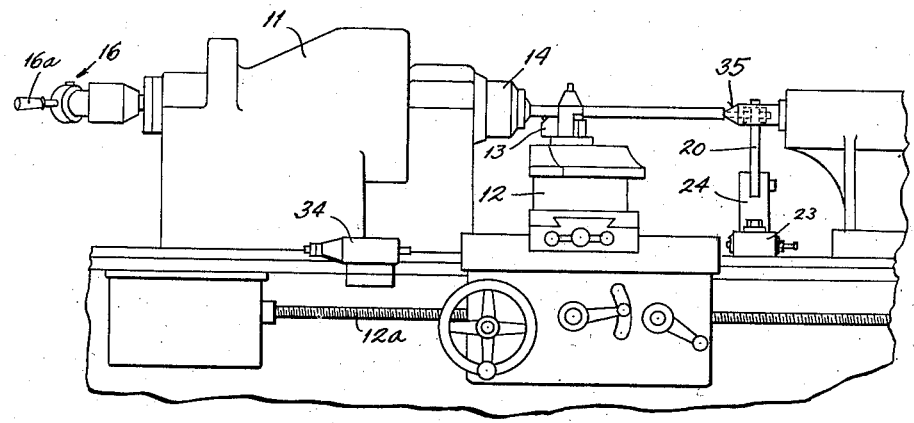
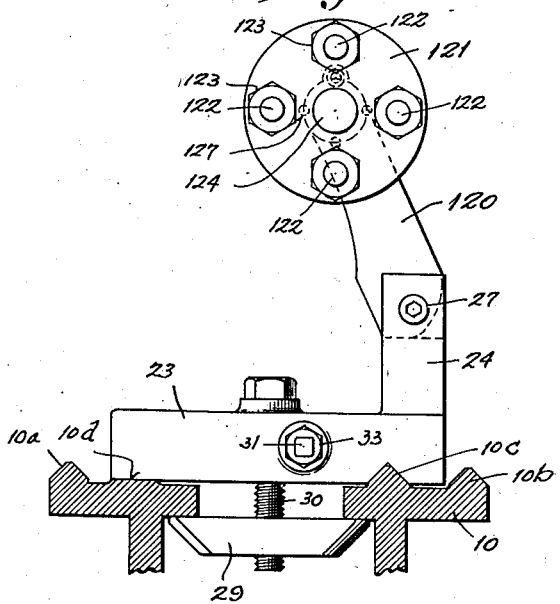 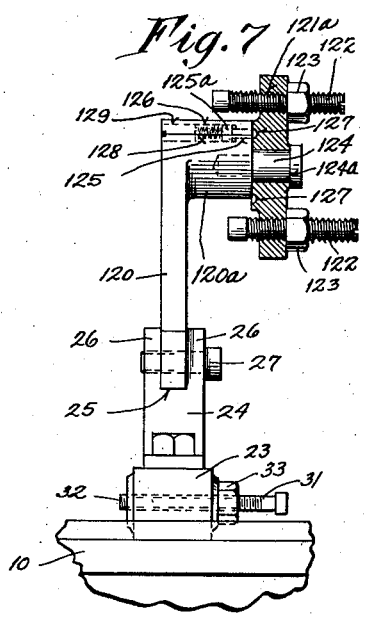
INVENTOR
Walter E. Berger
BY
ATTORNEYS Patented Jan. 8, 1946

2,392,571

UNITED STATES PATENT OFFICE 2,392,571

TOOL ATTACHMENT

Walter E. Berger, Bridgeport, Conn., assignor to Karl F. Berger, doing business as Berger Manufacturing Company, Bridgeport, Conn.

Application August 8, 1942, Serial No. 454,133

11 Claims. (Cl. 82—34)

The present invention relates to an attachment for a power tool and more particularly for a lathe.

In mass production of small pieces where speedy setups are essential, difficulties have been encountered in accurately positioning the work in the chuck of a lathe so that each piece will project a proper distance from the chuck.

One method of obtaining this result was to provide the tailstock spindle with a center having a flat work-engaging surface and move the tailstock spindle into the desired position for the surface to act as a stop for locating the work. After the work was located, the spindle was withdrawn out of the way of the operator and this operation repeated for each workpiece inserted. This method aided to some extent in properly locating the work. However, it presented new difficulties in that it required time to move the spindle into position and it was practically impossible to precisely locate the tailstock spindle in the same position for each piece of work.

These difficulties have been overcome with the present invention in which a work-engaging member is carried by a base fixed to the bed and is readily and easily movable on the base between alternate limits from an operative position in which it engages the work to determine the extent to which it projects from the chuck to an inoperative position wherein it is out of the way of the tool during cutting or other operations. Since this member is fixed in its relation with the chuck, it will always return to the same position when moved into operative relation and repeatedly locate the work properly in the machine and greatly increase the production of the machine.

If desired, the base for mounting the work engaging member can extend across the bed so that in addition to providing a means for accurately locating the work, the attachment of the present invention, when clamped to the bed, forms stop means or a mounting for a stop member for engaging the tool carriage and limiting movement of the carriage in the direction away from the headstock. When used with the usual micrometer stop of the lathe which limits movement of the carriage in the other direction, it permits accurate undercuts to be made with great rapidity.

If long pieces of work are employed, their projection from the chuck may be controlled by the work-engaging member of the present invention; but it is not desired to employ the member as a support therefor as the strain and pressure which would be required on the work-engaging member to carry out this function may throw it out of adjustment. Accordingly, the work-engaging member, after accurately locating the work, is thrown into inoperative position, and the tailstock is moved into position to support the work. In such instances, the base of the attachment may serve as a stop for the tailstock pedestal to properly position it.

In some cases, it may be desirable to perform a series of operations on a single workpiece which require the workpiece to be projected at different distances from the chuck. This is accomplished, according to another form of the present invention, by providing a plurality of adjustably mounted work-engaging members which may be brought into work-engaging or operative position to lock the work therein.

If operations are to be performed on the workpieces by tools carried by the tailstock spindle, the work-engaging member properly locates the work with respect thereto and the base acts as a stop for limiting movement of the tailstock pedestal toward the workpieces.

The stop means carried by the base may be adjustable so as to project from either face thereof and the position of the carriage or tailstock pedestal can be accurately determined.

A feature of the present invention resides in the simplicity and efficiency of the attachment which may be easily installed on any lathe without in any way modifying the structure of the lathe.

Other features and advantages of the invention will be apparent from the specifications and claims when considered in connection with the drawings, in which:

Figure 1 shows a side elevational view of a lathe with the attachment in place thereon.

Fig. 2 shows a side elevational view of the attachment.

Fig. 3 shows an end view of the attachment.

Fig. 4 shows a top plan view of the attachment.

Fig. 5 shows a long workpiece properly located in the chuck, with the attachment in inoperative position and the tailstock supporting the end of the workpiece.

Fig. 6 is a view similar to Fig. 2, showing another form of the invention.

Fig. 7 is an end view, partly in section, of the form of the invention shown in Fig. 6.

The attachment of the present invention is herein illustrated as applied to a lathe, although it may be used with other machines having work-positioning requirements similar thereto.

The usual lathe structure is shown in Fig. 1, wherein the bed 10 of the lathe has a headstock 11 at one end and a tool carriage 12 mounted on the bed of the lathe for movement therealong by the feed screw 12a.

Mounted on the tool carriage is the cutting tool 13. The live spindle of the headstock, which is usually hollow, is provided with a chuck 14 from which projects the work 15.

In the illustrated lathe, a manual drawbar mechanism 16 extending from the end of the headstock projects through the spindle to operate the jaws of the chuck in the well known manner.

The drawbar is hollow so that work can be fed therethrough or can be inserted from the right into the chuck, and, upon manipulation of the handle 16a, it is locked therein.

The attachment of the present invention has as one of its features the accurate locating of the work in the chuck. As will be apparent in mass production, particularly of small pieces, the speedy and proper positioning of the work in the chuck so that it projects the proper distance therefrom is of vital importance.

This is accomplished by the attachment of the present invention which comprises an arm 20 having a work-engaging member 21 thereon provided with a flat end 21a against which the work abuts. This work-engaging member, in the illustrated form of the invention, extends through the arm and is clamped in position thereon by a pair of clamping nuts 22, although it may be adjustably mounted on the arm by other similar means. This provides for adjustment of the projection of the member from the arm as may be required.

While the arm may be mounted on the lathe in many ways, in the preferred form of the invention a base or saddle 23 is provided which is of such length that it extends a substantial distance across the bed of the lathe. Adjacent one end of the base is an upstanding post 24 having a split end 25 forming prongs 26 between which the arm 20 is pivotally mounted by a screw 27 which extends through one prong and an aperture 20a in the arm and is threaded in the other prong.

As is shown in Fig. 2, the bed is provided with three V-shaped ways 10a, 10b and 10c and a flat way 10d. The tool carriage slides on the outer ways 10a, 10b. The base 23 rests on the way 10d and is provided with a V-shaped notch 28 which extends over the way 10c and properly positions the base on the bed. The base is clamped in a preselected position on the bed by a clamping member 29 disposed under the bed and drawn into clamping relation by draft means 30.

When the attachment is secured to the base, the arm is swung about the pivot into its operative position, as shown in full lines thereon in Fig. 2, and located therein by the engagement of the portion 20b of the bottom of the arm 20 with the bottom of the slot. In this position, the work-engaging member 21 is in line with the axis of the spindle so that it always is in position to engage and locate work disposed in the chuck at the end of the spindle. After the work has been located in the chuck, the arm may be thrown into an inoperative position in which it is out of the way of the operator and the cutting tool. This is shown in the dot-and-dash lines in Fig. 2 and is held in this position by the curved portion 20c engaging the bottom of the slot.

From the foregoing, it will be seen that I have provided an efficient work-positioning means. In setting up a job, the base is clamped to the bed and the member 21 adjusted in the arm so that it will properly limit the projection of the work from the chuck. The arm, being disposed between the two prongs, will be rigidly held in the fixed position on the base so that the member 21 will always be the proper distance from the chuck whenever it is swung into operative position.

Movement of the arm into inoperative position does not affect the adjustment so that it is readily available for repeated operations to accurately position successive pieces quickly in working position.

In addition to properly locating the work in the chuck, the attachment of the present invention, when employing a mounting means as herein illustrated, forms a stop for limiting the tool carriage in its movement away from the headstock. While the base itself would be sufficient to provide this stop, it is preferred to have a stop member 31 threaded in the base to extend transversely thereof and project from the opposite faces so that the end 32 may be adjusted to vary the point at which the tool carriage engages it. A lock nut 33 threaded on the stop member holds it in this position.

By properly positioning the stop member 31, the movement of the carriage with respect to the end of the workpiece can be regulated as required, and if used with the usual micrometer stop 34 of the lathe, which limits the movement of the carriage toward the headstock, accurate undercutting can be carried out in a simple and expeditious manner.

When workpieces of such a length as require support at their free ends are employed, the attachment of the present invention will be located on the bed to properly position the work in the chuck. After the work has been accurately positioned in the chuck by the attachment, the work-engaging member is thrown into inoperative position and the tailstock center 35, which may be freely rotatably mounted, if desired, run-up to support the free end of the accurately placed workpiece during the working operations on the workpiece as shown in Fig. 5. This prevents undue strain and pressure on the work-engaging member, which would be applied thereto if it was used to support the free end of the work during this operation and might readily change the adjustment of the member and alter the location of the succeeding workpieces.

The head of the stop member 31 may be utilized, too, as a stop for engaging the pedestal of the tailstock to limit the same when moved toward the work. This is especially desirous if the work is to be operated upon by a tool carried by the tailstock, and more particularly with the tailstock attachment of the type disclosed in copending application Serial No. 423,491, for the attachment of the present invention is positioned on the bed of the lathe to properly define the projection of the work from the chuck and the head of the stop member 31 acts to define the position of the tailstock with respect to the end of the work so positioned that operations by tools carried by the tailstock can be accurately carried out.

In some cases, it may be desired to carry out a series of operations on a single piece, which would require the positioning of the work at different distances from the end of the chuck. In order to accomplish this without having to shift the attachment on the bed of the lathe or vary the projection of the member 21, the form of the invention shown in Figs. 6 and 7 is employed in which the arm 120 is substituted on the base for the arm 20. The arm 120 has a boss 120a at the end to project from the face thereof to provide a support for the multiple work-engaging means.

In the herein illustrated form of the invention, the multiple work-engaging means comprises a disk 121 having a plurality of work-engaging members 122 adjustably mounted therein at predetermined intervals about the disk to project from the face thereof. As shown in Fig. 7, the members are threaded through apertures 121a in the disk and are clamped in position by lock nuts 123. The disk is rotatably mounted on the boss by a stud shaft 124 threaded into the face of the boss and having a shoulder 124a engaging the outer face of the disk, the boss projecting sufficiently so that the arm does not engage the members 121 to prevent rotation of the disk.

In order to hold the disk in predetermined position with respect to the arm, a pin or plunger 125 is carried in a socket 126 in the boss and projects from the face thereof to engage with recesses 127 formed on the disk in predetermined relation to said work-engaging members. The end of the socket engages the base 125a of the pin 125 to limit the projection of the pin. A spring 128 normally carried in the socket 126 in the boss normally yieldingly holds the pin 125 in projected position to engage the recesses. The tension of the spring can be varied by adjusting a plug 129 in the open end of the socket.

When it is desired, for example, to provide a series of annular grooves on a workpiece, the stop means on the base is adjusted to define the required movement of the carriage. The work-engaging members are then adjusted to project from the disk the required distance to locate the work in a series of positions which will place the portions of the work to be grooved in the range of movement of the tool carriage. After each cut is made, the disk is rotated to bring the next work-engaging member into position and the workpiece is again located thereby and the operation repeated as required.

The arm 120 is movable to and held in operative and inoperative position in the manner similar to the arm 20 so that the work-engaging members can be positioned to locate the work and then swung out of the way of the operator and tool.

While the disk and boss have been shown herein as being located on the side of the arm away from the headstock, it is to be understood that they may be disposed on the other side so as to have the work-engaging members in close proximity to the chuck.

Variations and modifications may be made within the scope of this invention and portions of the improvements may be used without others.

I claim:

1. An attachment for use with a lathe having a work holding chuck comprising a base overlying the bed of the lathe; a clamping member disposed below the bed; draft means for drawing the base and clamping member into clamping relation with said bed; a boss extending upwardly adjacent one end of the base; an arm pivotally mounted in said boss for movement transversely of the bed; a work-engaging member adjustably carried by the arm; means for limiting movement of said arm in a position in which the work-engaging member is in line with the center of the lathe chuck to limit the projection of the work therefrom; and means extending transversely of the base and projecting from the sides thereof to form stop means for engaging the tool carriage or tailstock pedestal to limit movement thereof.

2. An attachment for use with a lathe having a work holding chuck comprising a base overlying the bed of the lathe; a clamping member disposed below the bed; draft means for drawing the base and clamping member into clamping relation with said bed; a boss extending upwardly adjacent one end of the base; an arm pivotally mounted in said boss for movement transversely of the bed; a plurality of work-engaging members adjustably carried by the arm and selectively movable into operative position; means for holding the work-engaging members in selected position; and means for limiting movement of said arm in a position in which the work-engaging member in operative position is in line with the center of the lathe chuck to limit the projection of the work therefrom.

3. An attachment for use with a lathe comprising a supporting member mounted for movement transversely of the lathe; means adjustably secured on the lathe for mounting said member thereon; a plurality of work-engaging members adjustably carried by the supporting member and selectively movable into operative position with respect thereto; and means for limiting movement of said supporting member to locate the work-engaging member in position to engage the work in the lathe and limit the projection of the work therein.

4. An attachment for use with a lathe having a work holding chuck comprising a base to be adjustably secured to the lathe; an arm pivotally mounted on said base for movement transversely of the lathe; a member mounted on the arm for movement with respect thereto and having a plurality of work-engaging members adjustably carried thereby to project therefrom and selectively movable into operative position with respect to said arm; and means for limiting movement of said arm in a position in which the work-engaging member in operative position is in line with the center of the lathe chuck to limit the projection of the work therefrom, each of the work-engaging members being adjusted to extend a different amount whereby the projection of workpieces from the chuck may be varied without movement of the base.

5. An attachment for use with a lathe having a work holding chuck comprising a base to be adjustably secured to the lathe; an arm pivotally mounted on said base for movement transversely of the bed; said arm having an offset; a disk mounted for rotation on said offset; a plurality of work-engaging members adjustably carried by the disk and selectively movable by rotation of said disk into operative position with respect to said arm, the offset permitting movement of the work-engaging members to said operative position without interference by said arm; and means for limiting movement of said arm in a position in which the work-engaging member in operative position is in line with the center of the lathe chuck to limit the projection of the work therefrom.

6. An attachment for use with a lathe having a work holding chuck comprising a base to be adjustably secured to the lathe; an arm pivotally mounted on said base for movement transversely of the lathe and having a laterally projecting boss at one end; a disk rotatably mounted on the end of the boss; a plurality of work-engaging members carried by the disk to project therefrom, the work-engaging members being adjstable to vary the projection thereof and selectively movable into operative position with respect to the arm by rotation of said disk; a detent carried by the boss and cooperating with means on the disk for holding the work-engaging member in selected position; and means for limiting movement of said arm in a position in which the work-engaging member in operative position is in line with the center of the lathe chuck to limit the projection of the work therefrom.

7. In a lathe having a bed, a headstock provided with a chuck, and a tool carriage movable over the bed; an attachment therefor comprising a base; means for securing the base to the bed of the lathe beyond the tool carriage; a member mounted adjacent one end of the base for movement transversely of the bed; a work-engaging member adjustably carried thereby; means for limiting movement of said member in an operative position in which the work-engaging member is in line with the center of the lathe chuck to limit the projection of the work therefrom and in an inoperative position in which the member and work-engaging member do not interfere with the cutting operation; and means on the base for engaging the tool carriage and limiting outward movement thereof.

8. In a lathe having a bed, a headstock provided with a chuck, a tool carriage movable over the bed, and an adjustable stop for limiting movement of the tool carriage in the direction toward the chuck; an attachment comprising a base; means for adjustably securing the base to the bed of the lathe beyond the tool carriage; an arm pivotally mounted adjacent one end of the base for movement transversely of the bed; a work-engaging member adjustably carried thereby; means for limiting movement of said arm in an operative position in which the work-engaging member is in line with the center of the lathe chuck to limit the projection of the work therefrom and in an inoperative position in which the arm and work-engaging member do not interfere with the cutting operation; and means adjustably carried by the base for engaging the tool carriage and limiting movement thereof in the direction away from said chuck.

9. In a lathe having a bed, a headstock provided with a chuck and a tool carriage movable over the bed, an attachment comprising a base, means for securing the base to the bed of the lathe beyond the tool carriage, a supporting member mounted adjacent one end of the base for movement transversely of the bed, a plurality of work-engaging members adjustably carried by the member for movement therewith and movable with respect thereto into an operative position thereon, means for limiting movement of said member in a position in which the operative work-engaging member is in line with the center of the chuck to limit the projection of the work therefrom and in another position in which the supporting member and work-engaging member do not interfere with the cutting operation, and means on the base for engaging the carriage and limiting outward movement thereof.

10. In a lathe having a bed, a headstock provided with a chuck and a tool carriage movable over the bed; an attachment comprising a base, means for securing the base to the bed of the lathe beyond the tool carriage, a member mounted on the base for movement transversely of the bed, means having a plurality of work-engaging members adjustably mounted therein to project therefrom secured to the member for movement therewith and movable with respect thereto into an operative position thereon, means for limiting movement of said member in a position in which the operative work-engaging member is in line with the center of the chuck to limit the projection of the work therefrom and in another position in which the member and means mounted thereon do not interfere with the cutting operation, and means on the base for engaging the carriage and limiting outward movement thereof, each of the work-engaging members projecting a different amount whereby the location of a workpiece in a chuck may be varied without changing the limit of movement of the carriage.

11. In a lathe having a bed, a headstock provided with a chuck and a tool carriage movable over the bed; an attachment comprising a base, means for securing the base to the bed of the lathe beyond the tool carriage, a member mounted adjacent one end of the base for movement transversely of the bed, a disk having a plurality of work-engaging members adjustably carried thereby to project from the face thereof, means for rotatably mounting the disk on the member with the face thereof toward said headstock, said disk moving with the arm and also with respect thereto to selectively place one of the work-engaging members in an operative position thereon, means for limiting movement of said member in a position in which the operative work-engaging member is in line with the center of the lathe chuck to limit the projection of the work therefrom and in another position in which the member and disk carried thereby do not interfere with the cutting operation, and means on the base for engaging the carriage and limiting movement thereof on the bed, the work-engaging members projecting different amounts and locating workpieces in the chuck in different positions without changing the means for limiting movement of the carriage.

WALTER E. BERGER.